US007311887B2

(12) United States Patent
Altman et al.

(10) Patent No.: US 7,311,887 B2
(45) Date of Patent: Dec. 25, 2007

(54) HYBRID WET AND DRY ELECTROSTATIC PRECIPITATOR AMMONIA SCRUBBER

(75) Inventors: Ralph F. Altman, Chattanooga, TN (US); John Montgomery, Butte, MT (US); Boris Altshuler, North Miami Beach, FL (US); Wayne P. Buckley, Stanhope, NJ (US)

(73) Assignee: Siemens Enviromental Systems&Services, Pittsburgh, PA (US)

( * ) Notice: Subject to any disclaimer, the term of this patent is extended or adjusted under 35 U.S.C. 154(b) by 0 days.

(21) Appl. No.: 11/361,148

(22) Filed: Feb. 24, 2006

(65) Prior Publication Data

US 2007/0202028 A1    Aug. 30, 2007

(51) Int. Cl.
*B01D 53/50* (2006.01)
(52) U.S. Cl. .............................. 423/242.1; 423/243.01; 423/243.06; 423/244.01; 204/164; 204/174; 204/177; 204/178
(58) Field of Classification Search ............. 423/242.1, 423/243.01, 243.06, 244.01; 204/164, 174, 204/177, 178
See application file for complete search history.

(56) References Cited

U.S. PATENT DOCUMENTS

| | | | | |
|---|---|---|---|---|
| 5,225,175 A | * | 7/1993 | Lyon ........................... | 423/235 |
| 5,871,703 A | * | 2/1999 | Alix et al. .................. | 423/210 |
| 6,132,692 A | * | 10/2000 | Alix et al. .................. | 423/210 |
| 6,302,945 B1 | | 10/2001 | Altman et al. | |
| 6,365,112 B1 | | 4/2002 | Babko-Malyi et al. | |
| 6,991,771 B2 | * | 1/2006 | Duncan et al. ............. | 423/235 |
| 2003/0108469 A1 | * | 6/2003 | Alix et al. ............... | 423/242.1 |

FOREIGN PATENT DOCUMENTS

JP          56-118716 A    *   9/1981

* cited by examiner

*Primary Examiner*—Timothy C. Vanoy
(74) *Attorney, Agent, or Firm*—Curatolo Sidoti Co., LPA; Joseph G. Curatolo; Salvatore A. Sidoti

(57) ABSTRACT

A process reduces $SO_x$ emissions in a flue gas stream by adding a wet collector plate section to an existing electrostatic precipitator (ESP) or by converting the last field of an existing ESP to wet operation. To achieve the conversion, the last field or fields of an existing dry ESP are removed and replaced with components made from materials suitable for operation in a wet environment. After the ESP contains wet operation, ammonia is added to the flue gas stream while it is progressing through the collection plates in the ESP.

16 Claims, 1 Drawing Sheet

PEESP/Ammonia Scrubber Concept

HYBRID WET AND DRY ELECTROSTATIC PRECIPITATOR AMMONIA SCRUBBER

BACKGROUND

Electric utilities, manufacturing plants and industrial facilities typically burn fossil fuels like coal to produce electric power and heat for process requirements. Burning fossil fuel produces an emission stream containing a number of substances as by-products. These substances include fine particulate matter, mercury and oxides of nitrogen and sulfur. Oxides of sulfur, generally known as $SO_x$ are an environmental problem as both $NO_x$ and $SO_x$ compounds contribute to the formation of acid rain which is harmful to plant life, animal life and property.

The typical methods of reducing $NO_x$ and $SO_x$ emissions are by burning low-sulfur coal, fabric filters, the use of an electrostatic precipitator (ESP), catalytic systems or scrubbers which employ a flue gas desulfurization (FGD) apparatus. Burning low-sulfur coal reduces the particulate collection efficiency of the ESP and is much more expensive than ordinary coal. Using FGD equipment is very expensive to build and maintain.

There are a number of commercial technologies that can separately control power plant particulate and $SO_x$ emissions. Both ESP's and fabric filters are used for particulate control and either wet or dry scrubbers are used for $SO_x$ controls. The cost for both controls is moderate in terms of overall power generating costs, but both technologies require equipment that is substantial in size, and both technologies require considerable maintenance.

U.S. Pat. No. 6,302,945 B1 to Altman et al. discloses an electrostatic precipitator for removing sulfur dioxide and other polluting particles which has a wet liquid removal area or compartment downstream and in the last section of plates of the electrostatic precipitator. The precipitator uses a clear liquid scrubbing system to help remove sulfur dioxide.

U.S. Pat. No. 6,365,112 B1 to Babko-Malyi et al. discloses an improvement in an electrostatic precipitator for removing contaminates from a stream of contaminant-laden gas conducted through a conduit in the electrostatic precipitator by passing the reagent fluid through corona discharge active zones.

What is needed in the art is a process of sulfur oxide removal that is moderately priced and that can be used with existing pollution removal systems but yet achieve a high amount of sulfur removal.

SUMMARY

A process of treating coal combustion flue gas stream containing sulfur oxides using an electrostatic precipitator having installed plasma enhanced electrostatic precipitator electrodes is provided which comprises providing plasma enhanced electrostatic precipitator electrodes disposed in operative association with wet electrostatic precipitator collector plates, injecting ammonia into said flue gas stream, collecting sulfur oxides on wet collector plates, forming a mixture, and removing the mixture from the wet collector plates, thereby reducing content of sulfur oxides in emissions from the flue gas stream.

A process of treating combustion flue gas stream containing sulfur oxides using an electrostatic precipitator is provided which comprises providing electrostatic precipitator electrodes disposed in operative association with wet electrostatic precipitator collector plates, injecting ammonia into said flue gas stream, collecting sulfur oxides on wet collector plates, forming a mixture and removing the mixture from the wet collector plates, thereby reducing content of sulfur oxides in emissions from the flue gas stream.

DETAILED DESCRIPTION

Figure 1:
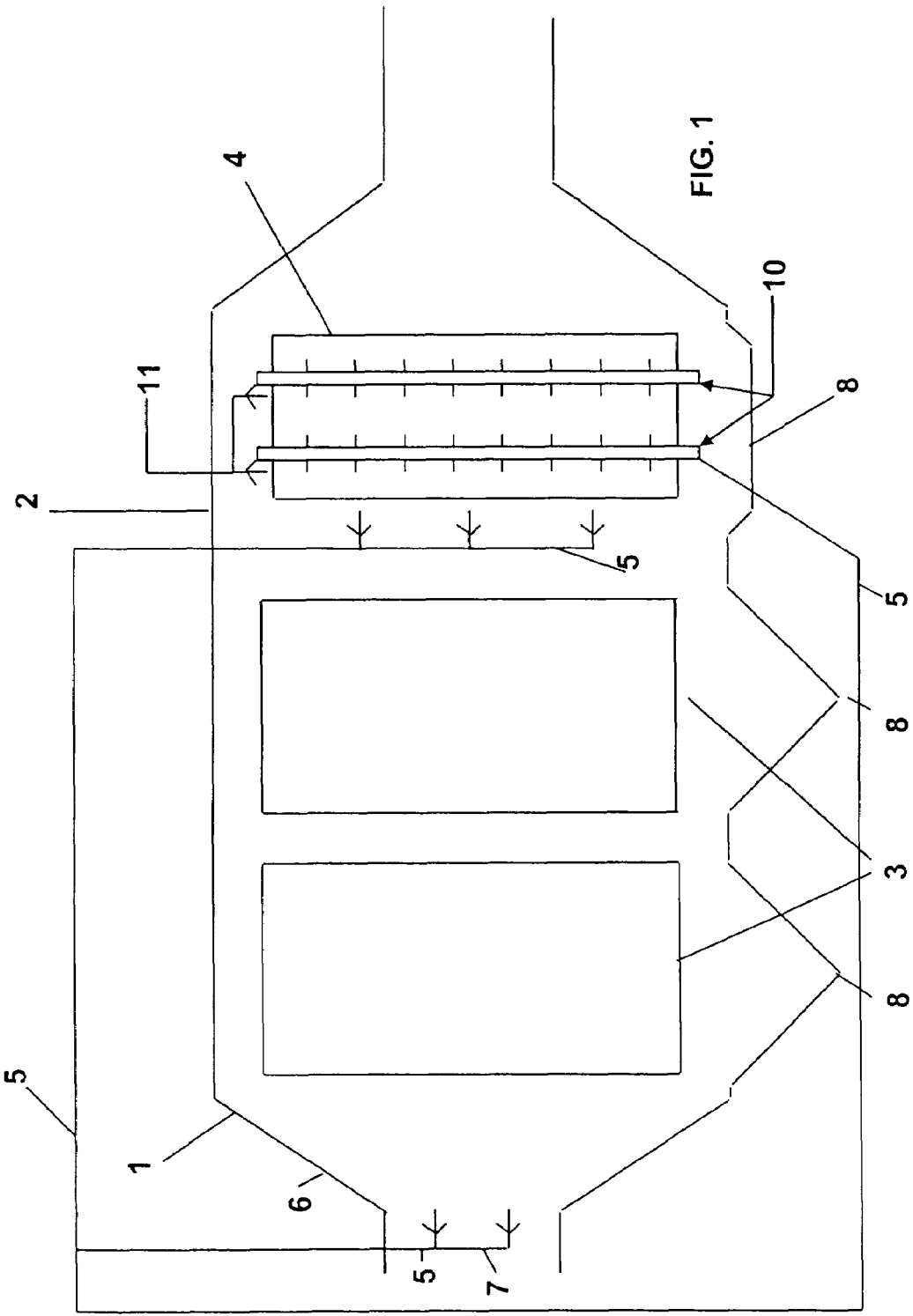
FIG. 1 is a schematic representation of the electrostatic precipitator, with a wet electrostatic precipitator section, wherein ammonia is added to the flue gas stream.

The present process of reducing $SO_x$ ($SO_2$ and/or $SO_3$) emissions adds a wet collector plate section to an existing electrostatic precipitator (ESP) or converts the last field of an existing ESP to wet operation. To effect the conversion, the last field or fields of an existing dry ESP are removed and replaced with components made from materials suitable for operation in a wet environment. After the ESP comprises a wet operation, ammonia is added to the flue gas stream while it is progressing through the collection plates in the ESP.

The present process greatly reduces the cost of $SO_x$ control and, at the same time, reduces power plant particulate emissions. Electrostatic precipitators normally have three or more electric plate sets in the direction of gas flow. In the disclosed process described herein, a wet ESP section is added to the last section of an ESP or one or more of the last plate sets of the ESP are physically removed and replaced with wet collector plates. Discharge electrodes with a design capable of operating in a high space charge environment are placed between the wet collector plates. In some embodiments, the electrodes use plasma enhanced electrostatic precipitator control technology (PEESP) as described in U.S. Pat. No. 6,365,112, which is incorporated herein, as if written out in full, below.

The PEESP electrodes may comprise a longitudinally-extending discharge electrode, and a collector electrode spaced laterally from the discharge electrode for establishing an electrostatic field between the discharge electrode and the collector electrode in response to a prescribed electrical potential between the discharge electrode and the collector electrode, a manifold passage extending longitudinally within the discharge electrode; a plurality of electrode elements located along the discharge electrode and projecting laterally from the discharge electrode into the conduit and toward the collector electrode, each electrode element terminating in at least one sharp-edged tip located within the conduit and spaced laterally from the collector electrode for establishing a corona discharge active zone juxtaposed with the tip in response to the prescribed electrical potential; an injector passage extending laterally through the discharge electrode at each electrode element, each injector passage communicating with the manifold passage and juxtaposed with the tip of a corresponding electrode element, and a source of reagent fluid communicating with the manifold passage for distributing reagent fluid through each injector passage toward each tip such that reagent fluid will pass through the corona discharge active zone juxtaposed with each tip for activating the reagent fluid as the reagent fluid is injected into the stream of contaminant-laden gas.

The choice of a reagent fluid is dictated by the particular contaminant to be removed from the stream of contaminant-laden gas. For example, where it is desired to remove mercury from the stream, the reagent fluid of choice includes water vapor and oxygen, preferably derived by mixing air or oxygen with steam in selected proportions. The mixture of water vapor and oxygen is effective in the treatment of most of the typical exhaust gas contaminants; thus, in addition to mercury, the mixture is effective in reducing the concentration of $SO_x$, $NO_x$, unburned organics and other incompletely oxidized species. The oxidation process is enhanced greatly in the presence of water droplets, because most of the oxidation products and byproducts are stabilized in respective aqueous solutions.

Aqueous solutions of various compounds can be utilized in the fluid reagent mixture to induce additional desired effects. For example, ammonia solutions may be used to enhance the removal of $SO_x$ from the stream, and to induce reactions leading to the formation of ammonium sulfate and/or ammonium sulfite.

The reagent fluid can be delivered to the corona discharge active zone in the form of a gas, an aerosol, a spray, fine powders entrained in a gaseous carrier, or any fluid form which will enable the reagent fluid to be activated in the corona discharge active zone for subsequent injection into the stream of contaminant-laden gas and reaction with a particular contaminant in the stream. The resultant reaction product carries a charge and is attracted to the collector electrode for subsequent removal, in a manner known in the operation of electrostatic precipitators.

Spray nozzles, with either a single fluid or dual fluid design, may be added to the ESP to allow for the introduction of a substantially clear liquor (a solution containing very little undissolved solids, rather than the slurries used in conventional lime/limestone scrubbers) into the volume surrounding the wet collector plates. The clear liquor may comprise a neutralizing solution of a sodium reagent. In another embodiment, the clear liquor is a sodium sulfite scrubbing solution. In another embodiment, the clear liquor may be alkaline. As the flue gas passes through the sprays of clear liquor scrubbing solution, the $SO_x$ is absorbed by the alkali water droplets. Further, with a sufficient volume of liquor directed toward the collection plates, a moving liquid film is created on the wet collector plates that continuously sweeps away the particulate matter deposited on the plates by the electrostatic forces in the ESP. The nozzles and plates may be arranged so that the quantity of liquid drops that exit from the last set of collection plates is minimized. Therefore, the solid particulate matter from the exhaust gas is electrostatically attracted to the collection plates, while the $SO_x$ gas is neutralized by the clear liquor scrubbing solution.

The disclosed process uses equipment that already exists at most power plants in the novel way described to significantly reduce both particulate and $SO_x$ emissions. It is the utilization of an existing piece of equipment, including the foundations, structural steel and casing, that is responsible in part for the significant reduction in cost that results from application of this process. Only addition of wet operation, or replacement of the internals of one or more sets of plates and the addition of the external liquor processing equipment, are needed.

Investigations of corona-induced plasma provided using PEESP show that removal efficiency for $SO_x$ and $NO_x$ are dependent on the chemical balance between pollutants in the flue gas, and chemically active species and radicals generated by the corona discharge. When a corona discharge is applied to a flue gas, energetic electrons are created, transferring energy to the dominant gas molecules ($N_2$, $O_2$, $H_2O$, $CO_2$) by collisions. These collisions result in the formation of primary radicals or negative ions ($O^*$, $N^*$, $OH^*$, $O_2^*$, etc). It has been shown that one radical or ion forms a radical/ion-cluster with several $SO_x$ molecules. Moreover, the clustering reaction can be generated in a core particle that consists of up to 30 $H_2O$ or $NH_3$ molecules.

The formation of radical/ion-clusters with $SO_2$ molecules may explain the reducing gas and liquid phase limitation in the boundary layer of the water film of a wet wall electrostatic precipitator (WESP). Under this condition, $SO_2$ removal efficiency was about 70% with 10 seconds residence time. Ammonia injection increased $SO_2$ removal efficiency to 85%. This marginal increase in $SO_2$ removal efficiency demonstrated that under regular WESP conditions, even with a long residence time (10 seconds), the gas phase reaction between $SO_2$ and $NH_3$ does not provide high $SO_2$ removal efficiency. Under a two-second residence time, representative of that found in a conventional WESP, $SO_2$ removal efficiency would be much lower.

During laboratory testing of the PEESP technology, ammonia gas was added to the simulated flue gas flowing into the PEESP test cell. The purpose was to determine the effect ammonia had on $SO_2$ removal with oxygen/water (steam) injection through the PEESP electrode and corona. The results of the tests showed that the addition of ammonia to the flue gas with oxygen/steam injection through the PEESP corona produced a dramatic drop of $SO_2$ concentration in the simulated flue gas, to less than 0.5 ppm, corresponding to 99.8% removal efficiency. Without ammonia addition, the maximum $SO_2$ removal efficiency was about 16%.

While not being limited to theory, it is believed that the $SO_2$ reduction may be due to gas phase reaction between $NH_3$, $SO_2$ and energized oxygen/water that takes place to form ammonia sulfite. Even when liquid water was sprayed from the electrified nozzles of the PEESP electrodes, $SO_2$ absorption increases significantly. It is theorized that the water vapor injected through the PEESP electrode creates a high concentration of negative ions, which catalyze the $SO_2$ and $NH_3$ gas phase reaction rate, improving $SO_2$ removal efficiency within the WESP. A removal efficiency of 99.8% was achieved for less than one-second retention time.

In one embodiment, an economical and highly efficient $SO_x$ scrubber is built by retrofitting the last section of a dry ESP with a wet ESP field with PEESP electrodes installed. In another embodiment, a wet ESP section is added after a dry ESP with PEESP electrodes installed. Ammonia gas may be added into the flue gas stream ahead of the dry ESP, between the dry ESP and wet ESP, into the wet ESP or directly through the PEESP electrodes. Because the wet ESP can be operated above the moisture dew point in an unsaturated flue gas condition, no downstream ductwork or stack lining has to be replaced. In one embodiment, the plates in the wet ESP section can be wetted by spray, a water trough system with a system of troughs located along the tops of the collection plates to distribute the water evenly along the length of the plates, or by condensation of flue gas moisture onto cooled plates. $SO_2$ removals of 20% to well over 90% are possible using this novel technology.

In one embodiment, an economical $SO_x$ scrubber of moderate efficiency is built by converting the last field of a conventional dry ESP to wet operation. In another embodiment, a wet ESP section is added after a conventional dry ESP. Ammonia gas may be added into the flue gas stream to react with $SO_2$ either by adding ammonia gas ahead of the ESP, ahead of the wet ESP section, or by spraying an ammonia solution into the wet ESP section. In this moderate efficiency scrubber, conventional discharge electrodes, such as stainless steel discharge electrodes rather than PEESP's discharge electrodes, are used. The wet ESP can be operated at or above the moisture saturation temperature of the flue gas. In an embodiment, the outlet temperature can range from saturation to 70° F. above the saturation temperature.

In operation above the moisture dew point, it is possible to operate without reheat or wet stack. Operation at the moisture dew point enhances $SO_2$ removal. In one embodiment, the plates in the wet ESP section can be wetted by spray, a water trough system or by condensation of flue gas moisture onto cooled plates. $SO_2$ removals of 20% to well over 90% are possible using these novel technologies.

Many coal-fired power generation plants have installed or will be installing selective catalytic reduction (SCR) technology for $NO_x$ control. SCR technology requires that an ammonia injection system be installed for the $NO_x$—$NH_3$ reaction. A problem with this technology is the potential ammonia slip created from any excess ammonia generation.

Ammonia slip from the SCR would be consumed in the converted wet ESP/ammonia scrubber field, and therefore would not be emitted into the atmosphere. Therefore, it would be possible to relax the ammonia slip limits for the SCR and reduce the size of the SCR since ammonia slip is sometimes the factor driving the size of the SCR.

In a recent economic study, it was determined that the ammonium sulfate produced by this process can be sold for a price that is sufficient to cover the cost of the ammonia consumed by the processes. While the aqueous solution produced by this process would contain mercury compounds that would have to be removed to produce a sellable by-product, there are commercial processes that could be used to effect removal at a reasonable cost. It has also been determined that ammonium sulfate produced by processes that remove $SO_x$ from flue gas can be sold for a price that is comparable to the cost of the ammonia consumed by the process.

For units burning coal that produce significant flue gas $SO_3$ levels, the addition of this technology would produce the side benefit of lowering the flue gas $SO_3$ concentration. Removal efficiency of 50% to 80% for $SO_3$ in the wet collection section have been measured using this process.

With reference to FIG. 1, an electrostatic precipitator 1 has dry collector plates 3 located in the inside housing 2 of the electrostatic precipitator 1. Ammonia can be added to the inside housing 2 in liquid or gas form before the dry collector plates 3 or ahead of the wet collector plates 4 using nozzles 5. Ammonia may also be added along with the wetting liquid by spraying out of nozzles 11 onto the wet collector plates 4. In another embodiment, the wetting liquid can contain ammonia. In FIG. 1 as shown, flue gas enters the housing 6 of the electrostatic precipitator 1 through an intake port 7 or front end and the flue gas containing $SO_x$ gases ($SO_2$ and/or $SO_3$) and other pollutants is given an electric charge by suspended electrodes (not shown) and caused to be attracted to and adhere to dry collector plates 3. Hoppers 8 are provided at the bottom of the housing 6 of the electrostatic precipitator to receive particles of pollutants and spent spray solution. In the figure, the hoppers 8 are shown as pyramid shaped, however, this shape is not critical, for example, the pyramid below the wet plate section could be truncated, as also shown in FIG. 1.

The dry collector plates 3 and wet collector plates 4 are arranged in rows across the direction of gas flow 9. Each depicted row of dry collector plates 3 (or set) and wet collector plates 4 is comprised of many parallel plates spaced apart. Dirty flue gas enters the precipitator 1 at one end 7 and flows through the spaces or gas passages between the parallel dry collector plates 3 and wet collector plates 4.

Discharge electrodes 10, which can be conventional electrodes or plasma enhanced electrostatic precipitator control technology electrodes, are centered in the space between the wet collector plates 4. A very high voltage is applied to the electrodes 10 which causes them to initiate a corona discharge. This discharge produces a stream of charged ions which, in turn, charges the particulate matter in the gas stream. At the same time, the high voltage applied to the electrodes 10 creates a strong electric field between the wet collector plates 4 and electrodes 10. This electric field moves the particles onto the wet "collection" plates 4 after the particles have become sufficiently charged.

In one embodiment of the disclosed electrostatic precipitator 1, the number of sets of plates in an operational series could be four, with three sets of dry collector plates 3 and one last set of wet collector plates 4. While the exact maximum number of sets of plates is not critical, in one embodiment, an electrostatic precipitator 1 may comprise eight sets of plates, namely, six sets of dry collector plates 3 and two sets of wet collector plates 4 or, for example, five sets of plates consisting of three sets of dry collector plates 3 and two sets of wet collector plates 4. Each set of plates can have as many as one hundred plates. As noted in FIG. 1, the plates are generally positioned so as to be in the direction of the gas flow.

The wet collector plates 4 may have higher voltages and current than the dry collector plates 3. Typically, for the wet collector plates 4, the voltage may be about 35 kilovolts for a 9-inch gas passage, and about 65 kilovolts for a 16 inch gas passage. The current in a typical wet collector plate 4 installation may be at least about fifty microamp per square foot of plate surface area or higher, as can be determined by those skilled in the art. Dry collector plates 3 may have a lower current.

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A process of treating coal combustion flue gas stream containing sulfur oxides using an electrostatic precipitator having installed plasma enhanced electrostatic precipitator electrodes comprising:
   a) providing plasma enhanced electrostatic precipitator electrodes disposed in operative association with wet electrostatic precipitator collector plates wherein the plasma enhanced electrostatic precipitator electrodes comprise a discharge electrode and a collector electrode;
   b) injecting ammonia into said flue gas stream through a corona discharge active zone between the discharge electrode and the collector electrode;
   c) collecting sulfur oxides on wet collector plates, forming a mixture; and
   d) removing the mixture from the wet collector plates, thereby reducing content of sulfur oxides in emissions from the flue gas stream.

2. The process of claim 1 wherein the wet collector plates are provided to the electrostatic precipitator by at least one of converting the last section of a dry electrostatic precipitator to a wet collector plate section, or adding a wet collector plate section after a dry electrostatic precipitator.

3. The process of claim 1 wherein the sulfur oxide is at least one of $SO_2$ or $SO_3$.

4. The process of claim 1 wherein the sulfur oxide is $SO_3$.

5. The process of claim 1 wherein the ammonia is added to the flue gas stream in at least one of the following areas:
   a) ahead of dry collector plates; or
   b) between dry collector plates and wet collector plates.

6. The process of claim 5 wherein the ammonia is added to the flue gas stream through the plasma enhanced electrostatic precipitator electrodes together with injected oxygen or steam.

7. The process of claim 1 wherein the ammonia is added to the flue gas stream in gaseous form.

8. The process of claim 1 wherein the wet collector plates are operated at or above the moisture saturation temperature of the flue gas.

9. The process of claim 1 wherein the wet collector plates are wetted by at least one of spray, a water trough system, or by condensation of flue gas moisture onto cooled wet collector plates.

10. A process of treating combustion flue gas stream containing sulfur oxides using an electrostatic precipitator comprising:
    a) providing electrostatic precipitator electrodes disposed in operative association with wet electrostatic precipitator collector plates wherein the plasma enhanced electrostatic precipitator electrodes comprise a discharge electrode and a collector electrode;
    b) injecting ammonia into said flue gas stream through a corona discharge active zone between the discharge electrode and the collector electrode in at least one of the following areas:
        i) ahead of the dry collector plates;
        ii) between dry collector plates and wet collector plates;
    c) collecting sulfur oxides on wet collector plates, forming a mixture; and
    d) removing the mixture from the wet collector plates, thereby reducing content of sulfur oxides in emissions from the flue gas stream.

11. The process of claim 10 wherein the wet collector plates are provided to the electrostatic precipitator by at least one of converting the last section of a dry electrostatic precipitator to a wet collector plate section, or adding a wet collector plate section after a dry electrostatic precipitator.

12. The process of claim 10 wherein the sulfur oxide is at least one of $SO_2$ or $SO_3$.

13. The process of claim 10 wherein the sulfur oxide is $SO_3$.

14. The process of claim 10 wherein the ammonia is added to the flue gas stream in gas form.

15. The process of claim 10 wherein the wet collector plates are operated at or above the moisture saturation temperature of the flue gas.

16. The process of claim 10 wherein the wet collector plates are wetted by at least one of spray, a water trough system, or by condensation of flue gas moisture onto cooled wet electrostatic precipitator plates.

* * * * *